United States Patent
Carino, Jr.

(10) Patent No.: US 6,353,818 B1
(45) Date of Patent: Mar. 5, 2002

(54) PLAN-PER-TUPLE OPTIMIZING OF DATABASE QUERIES WITH USER-DEFINED FUNCTIONS

(75) Inventor: Felipe Carino, Jr., Arcadia, CA (US)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/136,196

(22) Filed: Aug. 19, 1998

(51) Int. Cl.[7] ............................................. G06F 17/30
(52) U.S. Cl. ............................................. 707/2; 707/4
(58) Field of Search .............................. 707/1, 2, 3, 4, 707/5, 6, 10, 100, 101, 102, 104, 200; 703/1, 7; 709/216

(56) References Cited

U.S. PATENT DOCUMENTS

| | | | |
|---|---|---|---|
| 5,619,692 A | * 4/1997 | Malkemus et al. | 707/2 |
| 5,754,841 A | * 5/1998 | Carino, Jr. | 707/3 |
| 5,765,147 A | * 6/1998 | Mattos et al. | 707/4 |
| 5,822,750 A | * 10/1998 | Jou et al. | 707/2 |
| 5,864,843 A | * 1/1999 | Carino et al. | 707/4 |
| 5,875,334 A | * 2/1999 | Chow et al. | 707/3 |
| 5,893,104 A | * 4/1999 | Srinivasan et al. | 707/102 |
| 5,913,205 A | * 6/1999 | Jain et al. | 707/2 |
| 5,915,250 A | * 6/1999 | Jain et al. | 707/100 |
| 6,009,265 A | * 12/1999 | Huang et al. | 707/1 |
| 6,026,391 A | * 2/2000 | Osborn et al. | 707/2 |
| 6,032,143 A | * 2/2000 | Leung et al. | 707/2 |
| 6,122,644 A | * 9/2000 | Graefe et al. | 707/202 |

OTHER PUBLICATIONS (IEEE publication) Dynamic query re-optimization by Ng et al. (Scientific and Statistical Database Management (pp. 264–273) Jul. 30, 1999.*

* cited by examiner

Primary Examiner—Diane D. Mizrahi
(74) Attorney, Agent, or Firm—Gates & Cooper

(57) ABSTRACT

A method, apparatus, and article of manufacture for executing a database query in a database management system. The method comprises the steps of generating a plurality of query plans for the database query, evaluating the plurality of query plans using a measured value for the resource metric, selecting a query plan from the evaluated query plans based on the measured resource metric, and executing the selected query plan. The apparatus comprises a query plan generator for generating a plurality of query plans, each query plan optimized with respect to at least one resource metric, and a query plan evaluator, communicatively coupled to a resource object and a database management system node, the evaluator selecting a query plan from the optimized query plan according to a measured resource metric obtained from the global resource object. The article of manufacture comprises a program storage device tangibly embodying one or more programs of instructions executable by the computer to perform the method steps of executing a database query in a database management system, the method steps comprising the method steps above.

25 Claims, 4 Drawing Sheets

PLAN-PER-TUPLE OPTIMIZING OF DATABASE QUERIES WITH USER-DEFINED FUNCTIONS

CROSS-REFERENCE TO RELATED APPLICATIONS

This application is related to commonly owned applications:

Method and Apparatus for Providing Shared Data to a Requesting Client, Ser. No. 08/546,466, by Felipe Cariño Jr. et al., filed on Oct. 20, 1995 and now U.S. Pat. No. 5,930,786;

Method and Apparatus for Providing Access to Shared Data to Non-Requesting Clients, Ser. No. 08/546,070, by Felipe Cariño Jr. et al, filed on Oct. 20, 1995 and now U.S. Pat. No. 6,085,223;

Method and Apparatus for Managing Shared Data, Ser. No. 08/943,837, filed Oct. 3, 1997 which and now U.S. Pat. No. 5,873,083 is a continuation of U.S. application Ser. No. 08/546,283, by William P. Jones et al, filed on Oct. 20, 1995, now issued as U.S. Pat. No. 5,689,698; and Method and Apparatus for Extending a Database Management System to Operate with Diverse Object Servers, Ser. No. 08/546,059, by Felipe Carino Jr. et al., filed on Oct. 20, 1995 and now U.S. Pat. No. 5,864,843;

all of which applications are hereby incorporated by reference herein.

BACKGROUND OF THE INVENTION

1. Field of the Invention

The present invention relates in general to systems and methods of optimizing queries in database management systems, and in particular, to a method, apparatus, and article of manufacture for optimizing database queries with processing-intensive user defined functions.

2. Description of the Related Art

Large-scale integrated database management systems provide an efficient, consistent, and secure means for storing and retrieving vast amounts of data. This ability to manage massive amounts of information has become a virtual necessity in business today.

At the same time, wider varieties of data are available for storage and retrieval. In particular, multimedia applications are being introduced and deployed for a wide range of business and entertainment purposes, including multimedia storage, retrieval, and content analysis. Properly managed, multimedia information technology can be used to solve a wide variety of business problems.

For example, multimedia storage and retrieval capability could be used to store check signature images in a banking system. These images may then be retrieved to verify signatures. In addition, the authenticity of the signatures could be confirmed using content-based analysis of the data to confirm that the customer's signature is genuine. However, practical limitations have stymied development of large multimedia database management systems. Multimedia database information can be managed by ordinary relational database management systems (RDBMS), or by object-oriented database management systems (OODBMS). Each of these options present problems that have thus far stymied development.

While object-oriented database management systems are used in the "complex" object and long-running transaction sector, they are generally impractical for mainstream commercial use because they require a large initial capital investment and are incompatible with existing RDBMSs. Further, maintaining two separate data repositories in a RDBMS and a OODBMS is inconsistent with the database management philosophy of maintaining a secure consistent central repository for all data. RDBMSs such as the TERADATA® system are vastly more popular than OODBMS. However, existing RDBMSs cannot effectively handle large objects, such as multimedia objects. Also, although RDBMS database features and functions apply equally well to alphanumeric or multimedia data types, multimedia objects introduce new semantics problems, and require new strategies for manipulating and moving extremely large objects, which would otherwise overwhelm RDBMS computational capacity and the I/O capability of the computer implementing the RDBMS.

Content-based analysis of multimedia data in a database management system is also problematic. Multimedia data objects are usually large. For example, even using compression technologies, a 100 minute audio compact disc may contain as much as 132 Mbytes, and a 100 minute VHS movie may contain as much as 1.125 GBytes of data. Improving technologies will further increase data storage and processing requirements. For example, a 100-minute High Definition Television (HDTV) movie will require about 22.5 GBytes of storage. Aggravating this problem further is the fact that many content based algorithms are computationally intensive.

In general, SQL optimizers require and/or use cost estimation, tuple statistics, column demographics, histograms, indexes and/or sampling to optimize queries. Large multimedia databases where large objects (LOBs) are utilized in predicates via user defined functions (UDFs) introduce new load balancing and skew problems for any one of the managed resources. Estimation of UDFs execution costs is an effective technique when the average execution time has low variance, but estimation is less effective when the execution costs are highly variant.

One method of estimating UDF execution costs is by sampling. This technique involves running a random instance of every UDF in the query and using this information to generate an efficient query plan. Sampling is easy to implement, but assumes that a UDF execution time is uniform across all objects. If sampling is used on a UDF with large execution cost variance, then non-optimal plans may be generated.

Regardless of the technique used to generate a query plan (e.g. sampling or historical data), if the cost variance varies widely per tuple, then an efficient (optimal) plan may not be possible to generate at compile-time. Also, an efficient execution plan depends on how the system resources (processing capacity, memory, disk and network) are being used by all active queries. This affects not only high variant UDFs, but expensive uniform ones too. This variance (or expense) is relative to any one or more managed system resources. For example, a UDF that does content analysis on a video column where video lengths in the column span from 2 minutes in length to over 2 hours (note that this says nothing about the skew pattern within the column itself relative to distribution of sizes of videos).

From the foregoing, it is apparent that a method and system is needed for optimizing database queries usable invoking high variance or expensive (with respect to an attribute's memory, interconnect, CPU and disk spool space usage) (UDFs), particularly when LOBs are involved. The present invention satisfies that need.

The disclosed embodiment uses a plan-per-tuple optimization paradigm. This plan-per-tuple methodology is most useful for large objects used as predicate-based terms when a non co-located join is involved in the query, but is also useful for non co-located join operations as well. In plan-per-tuple optimization, the execution engine chooses from among N! resource optimization strategies; where N normally represents system manageable resources. In the illustrated embodiment, the N resources selected include: (i) interconnect saturation levels, (ii) available physical memory, (iii) central processing unit (CPU) utilization, and (iv) available disk spool space percentages, but this technique can be applied to any managed system resources. Using the techniques described in this disclosure, the optimizer search space does not include these N! resource optimization strategies. Instead, a plurality of query plans is generated, and the selected query plan is determined by execution engine run-time optimization strategies. When the optimizer identifies an expensive, or more importantly, a high variant user-defined function in the predicate (via collected statistics or historical information), the optimizer generates plans that incorporate plan-per-tuple optimization for that particular compiled query. By using a run-time execution strategy based on system resource availability, not compile-time optimizer search strategies, the present invention allows optimal queries to be selected for highly variant functions on large or continuously streamed objects.

SUMMARY OF THE INVENTION

To address the requirements described above, the present invention discloses a method, apparatus, article of manufacture, and a memory structure for optimizing database queries with user-defined functions.

The method comprises the steps of generating a plurality of query plans for the database query, evaluating the plurality of query plans using a measured value for the resource metric, selecting a query plan from the evaluated query plans based on the measured resource metric, and executing the selected query plan.

The apparatus comprises a query plan generator for generating a plurality of query plans, each query plan optimized with respect to at least one resource metric, and a query plan evaluator, communicatively coupled to a resource object and a database management system node, the evaluator selecting a query plan from the optimized query plans according to a measured resource metric obtained from the global resource object.

The article of manufacture comprises a program storage device tangibly embodying one or more programs of instructions executable by the computer to perform the method steps of executing a database query in a database management system, the method steps comprising the method steps above.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
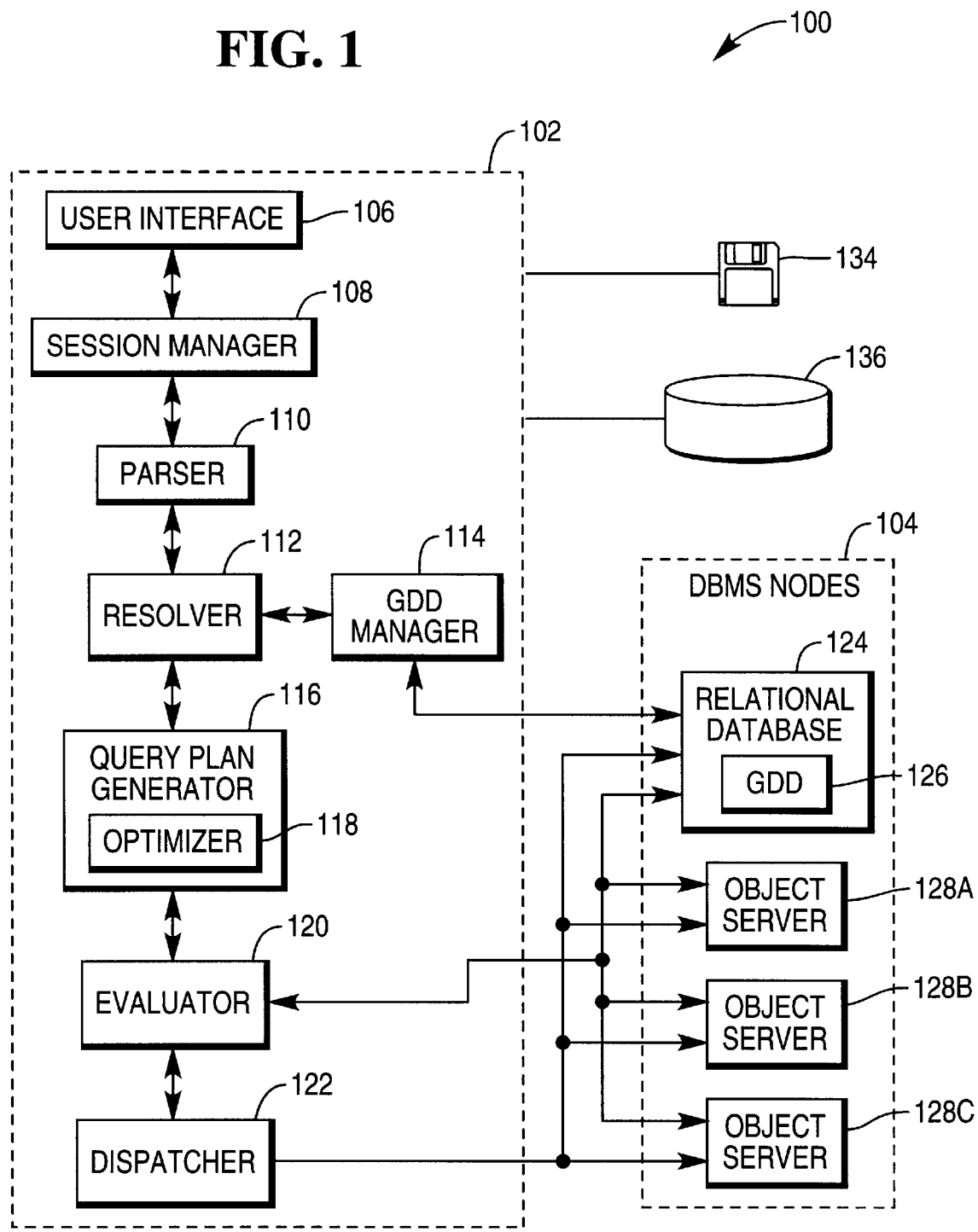
FIG. 1 is a block diagram showing an exemplary hardware environment implementing one embodiment of the present invention.

FIG. 1 is a block diagram showing a hardware environment implementing one embodiment of the present invention. A computer device 102 and one or more DBMS nodes 104 typically implement the database management system 100 of the present invention. The computer 102 implements a user interface 106, a session manager, a parser 110, a resolver 112, query plan generator 116, evaluator 120, and a dispatcher 122. DBMS nodes 104 may include one or more relational databases 124, and one or more object servers 128A, 128B, and 128C.

The user interface 106 translates computer messages into user-viewable results, and accepts client commands and translates those commands into computer interpretable instructions.

The session manager 108 creates a session that is used to communicate with the client, and assigns a session identifier. This session manager 108 handles incoming requests and sends back responses to the client.

The parser 110 checks the syntax of the client commands and uses a grammar definition to generate a high-level collection of object structures that will be later optimized and converted into a query execution plan. This is accomplished by defining language protocol classes (objects) that represent the parse tree. In one embodiment, these objects are defined according to the C++ protocol. For example, suppose the client wanted to retrieve data comprising a magnetic resonance image (MRI) for patients who are older than 45 years of age and a function that detects a tumor greater with a certain probability level, say 0.80. Further suppose that the information is stored in a "patient" DBMS table which includes object identifiers to MRI data in object storage. An SQL command responsive to this client request is as follows:

SELECT patient_name, MRI FROM patient
WHERE age>45 and FindTumor(MRI)>0.8

The parser 110 creates a link-list of attribute objects (such as "(patient_name, MRI)"), table name objects (such as "(patient)"), and predicate expressions. In the example above, there are two predicate expressions, (age>45) AND (FindTumor(MRI) >0.8). The first boolean predicate expression contains an attribute (age) and a scalar expression (>45). The second boolean predicate invokes a user-defined function that will operate on the object data. UDFs are described in detail later in this specification. The above example would result in a C++ pseudo-code generation such as described below:

ProjectList=ObjName (Patient_name), UDFType(MRI);
FromList=TblName (Patient)
Boolean1=BoolExprEval (age, BOOL_GT, 45);
Boolean2=BoolFuncEval (UDFExec(FindTumor(MRI)), GT, 0.8);
WhereClause=BoolAND (Boolean1, Boolean2);
ExecPlan=new SqlSelect (ProjectList, FromList, WhereClause).

The resolver 112 receives the object structures from the parser, iterates over the object parse tree, and binds attributes and UDF invocations to object-relational tables and libraries. The resolver 112 also appends statistical, static cost, and historical usage information to the parse tree objects. This information is later used to optimize the query plan. For example, in the example described above, the resolver 112 binds "patient_name" and MRI to the "patient" table, and makes sure that the function FindTumor(•) is a valid function for type MRI within the "patient" table.

The resolver 112 obtains statistical, static cost, and historical usage information from the Global Data Dictionary (GDD) 126, which is stored in the form of GDD tables in the RDBMS 124, and managed by the GDD manager 114. The GDD manager 114 also maintains a user-configurable and definable GDD cache that is updated when changes are made to the GDD 126. This is accomplished by spooling entries during data definition language (DDL) M-SQL operations or checking a time-stamp or version number associated with the GDD tables. If a change has occurred, the GDD manager 114 updates the GDD cache. The GDD cache structure is subdivided into boundary areas that are allocated to a GDD table whose values are replaced using a least recently used (LRU) algorithm. This method decreases system response times and improves overall performance. The GDD manager 114 also checks the integrity of the entries in the GDD 313.

The optimizer module 118 optimizes and balances query plans. Further discussion of the optimizer module's 118 operations is presented in the discussion appurtenant to FIG. 2.

The plan generator 118 translates the optimized parse tree into a query execution plan. This is performed by writing functions that transform parse-tree objects into multimedia step (M-Step) commands that can be understood by the component modules that will receive these commands. For example, the RDBMS M-Step can be SQL and for TERADATA® internal (AMP) steps and the object server 128 may use special object M-Steps that invoke UDF functions. The protocol for M-Step commands is stored in the M-Steps Definition and accessed by the plan generator module 116. Of course, those skilled in the art will recognize the present invention could be practiced with other command protocols as well.

The dispatcher 122 distributes the M-Steps to the RDBMS 124, and the object servers 128. For the RDBMS 124, these steps are interpreted according to the CLI protocol and are in the structured query language, SQL. For the object servers 128, these steps are sent to an interface manager (IM) for evaluation. The dispatcher 122 also coordinates execution of the M-Steps, and coordinates sending first-pass results from the M-Step commands to the requesting client.

Data and program storage devices 134 and 136 tangibly embodies program steps to perform processor instructions. The program storage device can include a CD-ROM, read/writeable CD-ROM, floppy disk, tape drive, magneto-optical storage apparatus, or similar device. Similarly, the instructions for performing operations implementing the present invention can be downloaded from a communicatively coupled computer on a local area network (LAN), wide area network (WAN), via an intranet, or the Internet.

Figure 2:
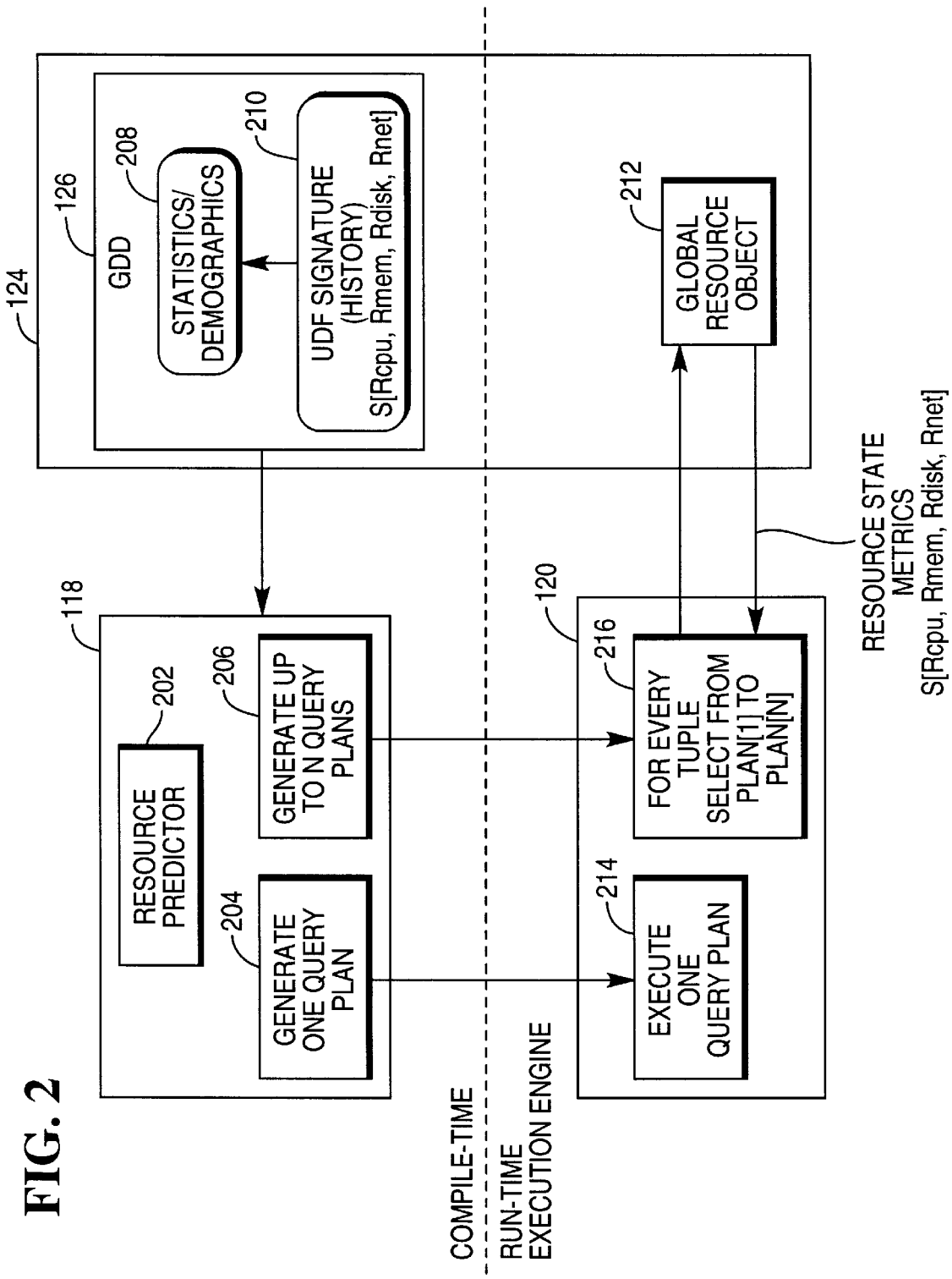
FIG. 2 is diagram showing the operation of the optimizer and evaluator.

FIG. 2 is a diagram illustrating the operation of the optimizer 118 and evaluator 120 of the present invention in further detail. As set forth above, there are two serious problems with performing functions on large data objects: expensive functions and variant function. The first problem involves the performance of "expensive" functions. In this context, an "expensive" function is one whose performance demands significant database management system 100 resources. This includes functions (user-defined or otherwise) that include computationally intense operations, regardless of the object operated upon, and functions calling for a large number of repeated operations. "Expensive" functions also include those that, although not ordinarily computationally intense, are demanding of system communication, memory, and processing requirements when applied to large objects.

Variant functions are those whose draw in the system resources (including memory, communication, and processing) is substantially variant. A good example of such an object is a video object. While the length of the object gives some indication of the amount of processing that will be required to perform functions on the object, the nature of the video data itself will be a significant factor in determining the system requirements for performing the function on the data. For example, the processing required for moving pictures experts group (MPEG) and other video-related data compression algorithms can be highly dependent on inter-frame and infra-frame scene complexity.

The optimizer module 118 comprises a resource requirement predictor 202. The resource requirement predictor predicts the resource requirements for the database query, reads statistics/demographics 208, and determines if the database query from the user implicates the invocation of expensive or substantially variant UDFs. The statistics and demographics 208 regarding resource metrics associated with the object and function are typically stored in the GDD 126, but may be stored elsewhere in the database management system (for example, with the functions or objects themselves). The statistics/demographics can also be augmented with information from a historical useage of the UDF or the object 210. The source of the statistical knowledge of resource usage by the UDF can be obtained in a variety of ways. For example, the optimizer module 118 may determine the memory resource useage statistics of a UDF on a large object column by tracking access heap or buffer spool space while the database management system is processing the LOB. Or, the CPU, disk 136 accesses, and disk spool space required per UDF invocation, which indirectly indicate interconnect cost, may be tracked.

FIG. 2 illustrates a resource state with four member resource metrics: processing requirements, denoted $R_{CPU}$, volatile memory requirements, denoted $R_{MEM}$, non-volatile memory requirements, denoted $R_{DISK}$, and communication requirements, denoted $R_{NET}$.

If the resource predictor determines that the database query does not implicate the invocation of an expensive function or a function with an unacceptably high variance, the optimizer 118 generates a single query plan, as shown in block 204. In doing so, the optimizer module 118 optimizes and balances query plans using the appended cost values from the GDD 126 and derived costs computed from the parse tree. The optimizer module 118 iterates over the parse tree while evaluating parse tree branch options to modify the object parse tree which is used by the plan generator 116 to generate optimized query plans. Of course, the number of iterations can be bounded to avoid excessive optimization time.

Many different optimization algorithms and optimization criteria are within the scope of the present invention. For example, parse object trees may be optimized with regard to any or all of the following criteria: query response time, system throughput, primary network traffic and usage, temporary result and space management, parallel or concurrent execution of query steps, predicate evaluations involving one or more UDFs, and resource allocation provided to individual queries. Also, although a system in which the optimization precedes plan generation, other implementations are within the scope of the current invention. The process of optimization can be performed any time after binding, and different data structures may indicate that optimization should occur after the query plans are generated.

If the resource predictor 202 determines that the database query implicates the invocation of an expensive function or a function with an unacceptably high variance, the optimizer 118 generates a plurality of query plans, as shown in block 204, each of which is optimized with a particular set of system resource metrics. For example, a query plan that optimizes resources in the processing, volatile memory, non-volatile memory, may be denoted as PLAN [$R_{CPU}$, $R_{DISK}$, $R_{mem}$, and $R_{net}$]. This query plan may be selected for use later by the evaluator 120 based on the resource availability for the candidate DBMS nodes 104 under consideration. Of course, query plans may be optimized with a single resource metric (such as $R_{DISK}$) as well. Typically, the foregoing query plans are generated at compile-time, not execution-time.

In the case where a single query plan was generated by the optimizer 118, the evaluator merely selects that plan, and communicates with the dispatcher 122 to distribute the steps implementing the query to the relational database 124 and/or one or more of the object servers 128. In the case where an expensive or unacceptably high variance function was invoked by the user query, the evaluator 120 queries the global resource object 212 at execution to retrieve information regarding the resource state (or individual resource metrics) of the DMBS node(s). The resource state (one or more resource metrics) is then used to determine which of the plurality of generated query plans will be used to perform the function. If necessary the resource state information can be granulized to an appropriate level to minimize the number of query plans that need to be generated and to simplify the selection. The evaluator 120 can also make the query plan selection based upon additional factors, such as the UDF statistical information 208, tuple attribute information (e.g. size and location).

Where multiple resource metrics are used, the order and importance of each resource metric should be determined. That is, it could be that the volatile memory, instead of the processing capacity, is the most important resource metric. Note that if the resource states have four resource metric members, there will be 4! (24) ways to organize resource priorities. Hence, the order selected may be different for any two tuples in an operation. In such cases, the evaluator 120 may select a query plan that minimizes a weighted combination of resources metrics, ordered sets of resource metrics, or simply selects the query plan with the lowest resource metric for a dominant resource metric.

Finally, since there are many DBMS nodes 104 that may potentially execute the function, the evaluator may obtain resource metrics for all of the DBMS nodes, and use this information to select not only the query plan, but the DBMS node that will actually perform the indicated operations.

Process

Figure 3:
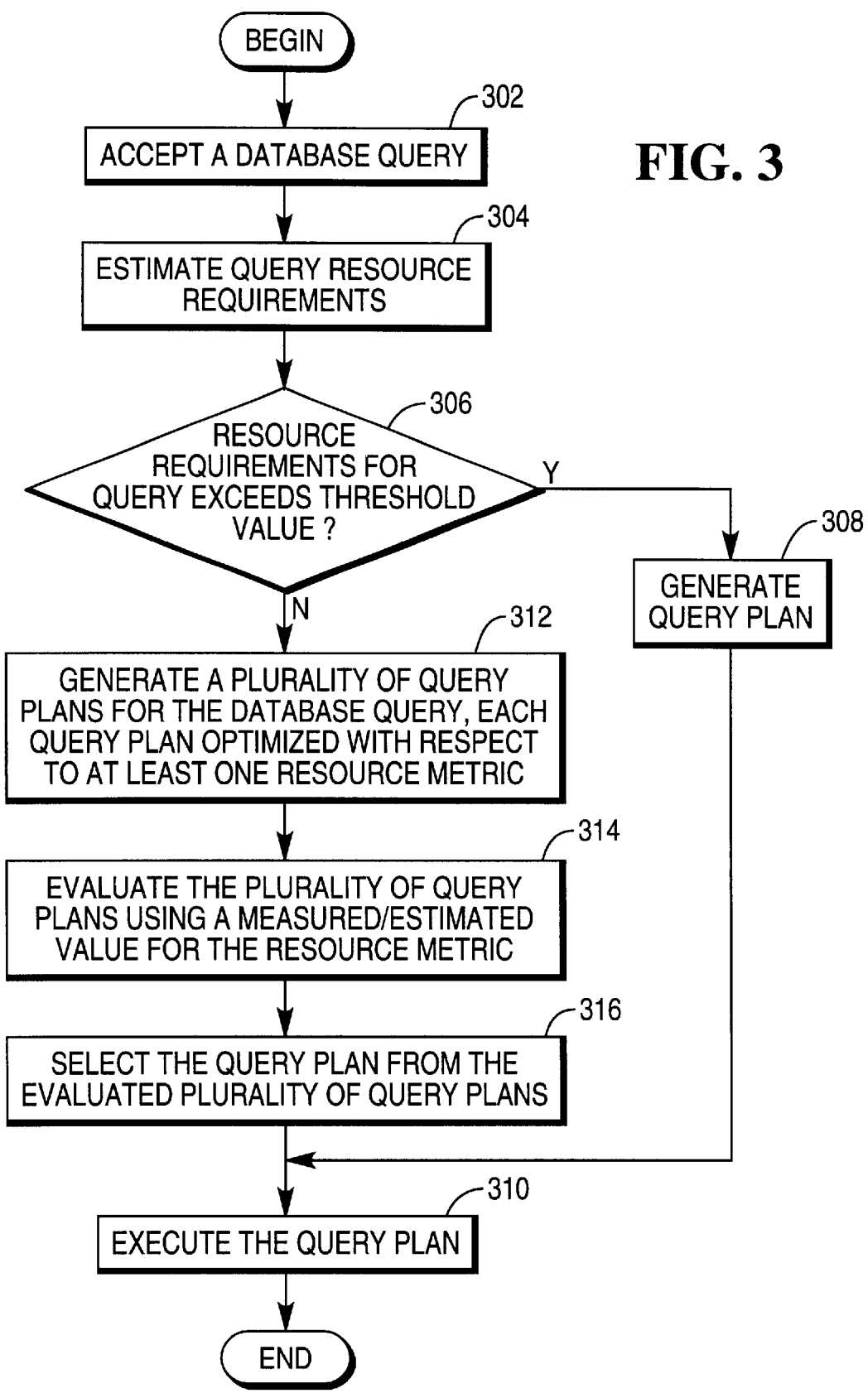
FIG. 3 is a flow chart illustrating exemplary process steps used to practice one embodiment of the present invention.

FIG. 3 is a flow chart showing the operations used to practice one embodiment of the present invention. First, as shown in block 302, the computer 102 accepts a database query. Next, the resource requirements to perform the query are estimated, as shown in block 304. As described herein, this can consider either the expense of the database operation, the variance of the database operation, or both factors. The expense of the operation can include statistics regarding the operation, the object, or both. Next, the estimated resource requirements are compared to a threshold value to determine whether execution-time query optimization techniques are required. If the resource requirements compare favorably to the threshold value, execution time query optimization techniques are not required, and a query plan is generated and executed. These operations are depicted in blocks 304–310.

By way of example, consider the database query previously discussed:

SELECT patient_name, MRI FROM patient
WHERE age>45 and FindTumor(MRI)>0.8.

After parsing, this database query results in the following function command:

Boolean2=BoolFuncEval (UDFExec(FindTumor(MRI)), GT, 0.8);

The "FindTumor(MRI)" function is a UDF that examines an MRI and returns a value related to the probability that a tumor was detected in the MRI object data. To estimate the query resource requirements for this function, resource metrics such as the processing, volatile memory, non-volatile memory, and communication requirements implicated by this query are estimated by the optimizer 118, using statistical/demographic data 208 stored in the GDD 126. The optimizer then decides whether to proceed with a single query plan or multiple query plans based upon a comparison between these estimated resource metrics and a threshold value derived from the baseline capabilities of the DMBS nodes 104. The threshold for each resource metric (or weighted combination thereof) can be selected to assure that the optimizer makes a minimum cost decision whether to resort run time optimization. If necessary, the threshold for this decision can be made adaptive by keeping track of the decision errors, and modifying the threshold to minimize them, and by relating the resource metric with object data values. By way of example, a simple resource predictor technique may comprise a table of threshold values relating the size of the object data and the function to be applied to the object data.

If the comparison with the threshold indicates that the FindTumor function is an expensive function (requires significant resources), or one which for which the resources vary widely (variant function), the optimizer 118 generates a plurality of query plans, each optimized for different resource metrics at compile time. One of these query plans will be selected by the evaluator 120 to perform the FindTumor function. The evaluator 120 will make this decision at run time, after obtaining either measured values or generating predicted values for the resource metrics.

Figure 4:
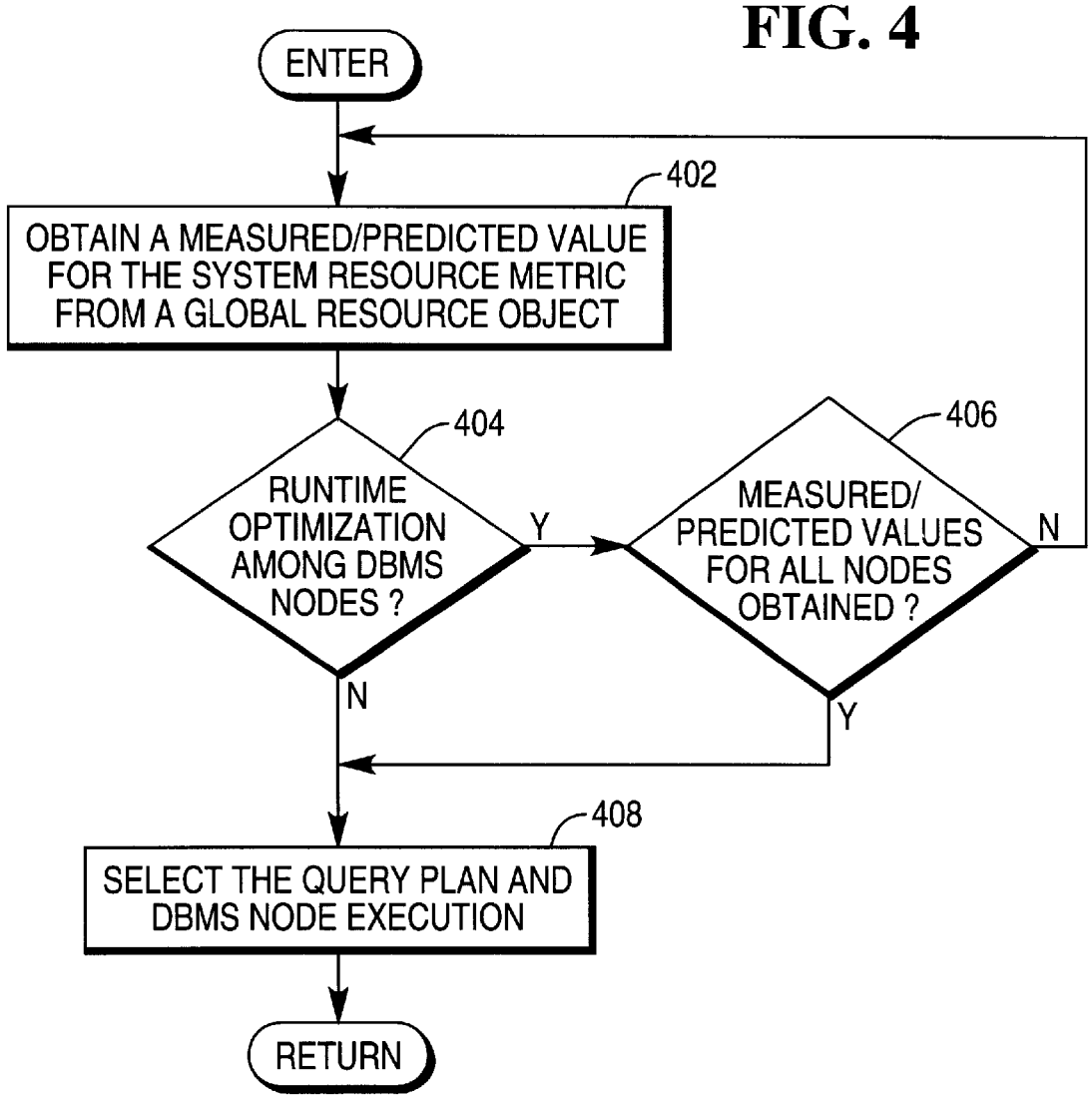
FIG. 4 is a flow chart presenting an illustrative embodiment of the process steps used to select a query plan from a set of evaluated query plans.

FIG. 4 is a flow chart presenting an illustrative embodiment of the process steps used to select the query plan from the evaluated plurality of query plans. In one embodiment, the evaluator 120 of the present invention compares query plans optimized for certain resource metrics (or combinations thereof), and selects the query plan based on measured (or predicted) values for the resource metrics obtained from the DBMS nodes 104. However, the present invention can be practiced on database systems with multiple DBMS nodes 104. In such cases, the present invention can perform a further runtime optimization by considering selecting the optimal query/DBMS node 104 pairing, and by routing the query to the selected node for execution. For example, the query plans generated for the FindTumor function discussed above may include a query plan that is optimized to minimize processing requirements, while another may be optimized to minimize memory requirements. A first DBMS node 104, such as object server 128A may report resource metrics indicating that it has little available processing capability, but plenty of memory. A second DBMS node 104, such as object server 128B, may report resource metrics indicating that it has little memory available, but it is short on processing capacity. In this case, the evaluator 120 would select one of the two query plans and route that query plan to the appropriate DBMS node 104. When selecting among query plans and DBMS node 104 pairings, the evaluator 120 may generate a value indicative of the expected "cost" of each of the two options, and select the lowest "cost" option.

Hence, the present invention provides not only the selection of query plans based on runtime measurements of system resource metrics, but also allows direction of the query plan to any one of a number of DBMS nodes 104 for execution. FIG. 4 illustrates a sequence of operations that may be used to implement this functionality. First, as shown in block 402, a measured/predicted value for the system resource metric is obtained from a global resource object 212. Then, according to the logic represented in block 404, if runtime optimization among DBMS nodes 104 is selected, measured/predicted values for all appropriate DBMS nodes 104 are obtained. This may proceed for all available DBMS nodes 104, or only those nodes that have been determined to be likely to have the capacity to respond to the function/object pair. This is illustrated in blocks 404 and 406. After the required information has been obtained, the query plan and DBMS node 104 pair is selected, and the query plan is dispatched to the proper DBMS node 104 for execution.

Conclusion

This concludes the description of the preferred embodiments of the present invention. In summary, the present invention describes a method, apparatus, and article of manufacture for executing a database query in a database management system.

The method comprises the steps of generating a plurality of query plans for the database query, evaluating the plurality of query plans using a measured value for the resource metric, selecting a query plan from the evaluated query plans based on the measured resource metric, and executing the selected query plan.

The apparatus comprises a query plan generator for generating a plurality of query plans, each query plan optimized with respect to at least one resource metric, and a query plan evaluator, communicatively coupled to a resource object and a database management system node, the evaluator selecting a query plan from the optimized query plan according to a measured resource metric obtained from the global resource object.

The article of manufacture comprises a program storage device tangibly embodying one or more programs of instructions executable by the computer to perform the method steps of executing a database query in a database management system, the method steps comprising the method steps above.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of executing a database query in a database management system, comprising the steps of:
    (a) generating a plurality of query plans for the database query, each query plan optimized with respect to at least one system resource metric of the database management system;
    (b) at run time, evaluating the plurality of query plans using a measured value for the system resource metric;
    (c) selecting a query plan from the evaluated plurality of query plans based on the measured value; and
    (d) executing the selected query plan in the database management system; predicting at least one resource requirement for the query; generating a plurality of query plans for the database query, each query plan optimized with respect to at least one system resource metric of the database management system; at run time, evaluating the plurality of query plans using a measured value for the system resource metric; selecting a query plan from the evaluated plurality of query plans based on the measured value; executing the selected query plan in the database management system; when the predicted resource requirement exceeds a threshold value, and generating a query plan when the predicted resource requirement does not exceed the threshold value.

2. The method of claim 1, wherein the step of generating a plurality of query plans is performed at a database management system compile time, and the steps of evaluating the plurality of query plans and selecting a query plan are performed at a database management system run time.

3. The method of claim 1, wherein the query invokes a predicate user-defined function (UDF).

4. The method of claim 1, further comprising the steps of:
    determining if the query invokes a resource critical operation;
    performing steps (a)–(c) when the query involves a resource critical operation; and
    generating a query plan when the query does not invoke a resource critical operation.

5. The method of claim 1, further comprising the steps of
    determining if the query invokes a substantially variant operation;
    performing steps (a)–(c) when the query invokes a substantially variant operation; and
    generating a query plan when the query does not invoke a substantially variant operation.

6. The method of claim 1, wherein the step of evaluating the plurality of query plans using a measured value for the system resource metric comprises the step of obtaining the measured value for the system resource metric from a global resource object.

7. The method of claim 1, wherein the system resource metric is selected from the group comprising:
    an available processing capacity of a database management system node;
    an available non-volatile memory for a database management system node;
    an available volatile memory capacity of a database management system node; and
    an available communications throughput capacity from a first database management system node to a second database management system node.

8. The method of claim 1, wherein the database management system comprises a plurality of database management system nodes and wherein:

the step of evaluating the plurality of query plans using a measured value for the system resource metric comprises the step of obtaining the measured value of the system resource metric for each of the database management system nodes; and the step executing the query plan comprises the step of executing the selected query plan at a database management system node selected according to the measured value for the system resource metric at the database management system node.

9. An apparatus for executing a database query in a database management system, comprising:

a query plan generator for generating a plurality of query plans, each query optimized with respect to at least one system resource metric of the database management system; and a query plan evaluator, communicatively coupled to a global resource object and a database management system node, the query plan evaluator for evaluating and selecting a query plan from the plurality of query plans at run time according to a measured system resource metric obtained from the global resource object means for predicting at least one resource requirement for the query; means for determining when the predicted resource requirement exceeds a threshold value; and means for generating a query plan when the predicted resource does not exceed the threshold value.

10. An apparatus for executing a database query in a database management system, comprising:

(a) means for generating a plurality of query plans for the database query, each query plan optimized with respect to at least one system resource metric of the database management system;

(b) means for evaluating the plurality of query plans at run time using a measured value for the system resource metric;

(c) means for selecting a query plan from the evaluated plurality of query plans based on the measured value; and (d) means for executing the selected query plan in the database management system means for predicting at least one resource requirement for the query; means for determining when the predicted resource requirement exceeds a threshold value; and means for generating a query plan when the predicted resource does not exceed the threshold value.

11. The apparatus of claim 10, wherein the plurality of query plans is generated at a database management system compile time, and the plurality of query plans is evaluated and a query plan is selected at a database management system run time.

12. The apparatus of claim 11, wherein the query invokes a predicate user-defined function (UDF).

13. The apparatus of claim 10, further comprising:
means for determining if the query invokes a resource critical operation;
means for determining when the query involves a resource critical operation; and
means for generating a query plan when the query does not invoke a resource critical operation.

14. The apparatus of claim 10, further comprising:
means for determining if the query invokes a substantially variant operation;
means for determining when the query invokes a substantially variant operation; and
generating a query plan when the query does not invoke a substantially variant operation.

15. The apparatus of claim 10, wherein the means for evaluating the plurality of query plans using a measured value for the resource metric comprises means for obtaining the measured value for the system resource metric from a global resource object.

16. The apparatus of claim 10, wherein the system resource metric is selected from the group comprising:
an available processing capacity of a database management system node;
an available non-volatile memory for a database management system node;
an available volatile memory capacity of a database management system node; and
an available communications throughput capacity from a first database management system node to a second database management system node.

17. The apparatus of claim 10, wherein the database management system comprises a plurality of database management system nodes and wherein:

the means for evaluating the plurality of query plans using a measured value for the system resource metric comprises a means for obtaining the measured value of the system resource metric for each of the database management system nodes; and the means for executing the query plan comprises a means for executing the selected query plan at a database management system node selected according to the measured value for the system resource metric at the database management system node.

18. A program storage device, readable by computer having a processor and a memory, tangibly embodying one or more programs of instructions executable by the computer to perform the method steps of executing a database query in a database management system, the method steps comprising the steps of:

(a) generating a plurality of query plans for the database query, each query plan optimized with respect to at least one system resource metric of the database management system;

(b) at run time, evaluating the plurality of query plans using a measured value for the system resource metric;

(c) selecting a query plan from the evaluated plurality of query plans based on the measured value; and (d) executing the selected query plan in the database management system; predicting at least one resource requirement for the query; generating a plurality of query plans for the database query, each query plan optimized with respect to at least one system resource metric of the database management system; at run time, evaluating the plurality of query plans using a measured value for the system resource metric; selecting a query plan from the evaluated plurality of query plans based on the measured value; executing the selected query plan in the database management system, and when the predicted resource requirement exceeds a threshold value, generating a query plan when the query resource requirement does not exceed the threshold value.

19. The program storage device of claim 18, wherein the method step of generating a plurality of query plans is performed at a database management system compile time, and the method steps of evaluating the plurality of query plans and selecting a query plan are performed at a database management system run time.

20. The program storage device of claim 18, wherein the query invokes a predicate user-defined function (UDF).

21. The program storage device of claim 18, wherein the method steps further comprise the method steps of:

determining if the query invokes a resource critical operation;

performing steps (a)–(c) when the query involves a resource critical operation; and generating a query plan when the query does not invoke a resource critical operation.

22. The program storage device of claim 18, wherein the method steps further comprise the steps of:

determining if the query invokes a substantially variant operation;

performing steps (a)–(c) when the query invokes a substantially variant operation; and generating a query plan when the query does not invoke a substantially variant operation.

23. The program storage device of claim 18, wherein the method step of evaluating the plurality of query plans using a measured value for the system resource metric comprises the method step of obtaining the measured value for the system resource metric from a global resource object.

24. The program storage device of claim 18, wherein the system resource metric is selected from the group comprising:

an available processing capacity of a database management system node;

an available non-volatile memory for a database management system node;

an available volatile memory capacity of a database management system node; and an available communications throughput capacity from a first database management system node to a second database management system node.

25. The program storage device of claim 18, wherein the database management system comprises a plurality of database management system nodes and wherein:

the method step of evaluating the plurality of query plans using a measured value for the resource metric comprises the method step of obtaining the measured value of the system resource metric for each of the database management system nodes; and the method step of executing the query plan comprises the method step of executing the selected query plan at a database management system node selected according to the measured value for the system resource metric at the database management system node.

* * * * *

UNITED STATES PATENT AND TRADEMARK OFFICE
CERTIFICATE OF CORRECTION

PATENT NO. : 6,353,818 B1
DATED : March 5, 2002
INVENTOR(S) : Carino, F. Jr.

It is certified that error appears in the above-identified patent and that said Letters Patent is hereby corrected as shown below:

Column 12,
Line 7, after "the" insert -- system --

Signed and Sealed this

Twenty-second Day of February, 2005

JON W. DUDAS
*Director of the United States Patent and Trademark Office*